United States Patent [19]

Tate

[11] Patent Number: 4,958,452
[45] Date of Patent: Sep. 25, 1990

[54] ANIMAL IDENTIFICATION EAR TAG ASSEMBLY

[75] Inventor: Lloyd Tate, Georgetown, Tex.

[73] Assignee: Zoecon Corporation, Dallas, Tex.

[21] Appl. No.: 413,327

[22] Filed: Sep. 27, 1989

[51] Int. Cl.⁵ .......................... G09F 3/00; F16B 43/00
[52] U.S. Cl. ..................................... 40/301; 411/531; 119/96
[58] Field of Search ................. 40/300, 301, 302, 303; 24/12, 13, 711.4; 119/156, 96; 411/531, 533, 371, 372, 373, 158, 160, 161, 162

[56] References Cited

U.S. PATENT DOCUMENTS

| | | | |
|---|---|---|---|
| 3,088,361 | 5/1963 | Hallock | 411/371 |
| 3,731,414 | 5/1973 | Murphy | 40/301 |
| 3,826,030 | 7/1974 | Read | 40/301 |
| 4,060,922 | 12/1977 | Roggers | 40/302 |
| 4,425,726 | 1/1984 | Dvorak | 40/301 |
| 4,425,874 | 1/1984 | Child | 40/301 |
| 4,451,999 | 6/1984 | Yvorra | 40/301 |
| 4,471,546 | 9/1984 | Bolling | 40/301 |
| 4,581,834 | 4/1986 | Zatkos et al. | 40/301 |
| 4,597,208 | 7/1986 | Chevillot | 40/301 |
| 4,612,877 | 9/1986 | Hayes et al. | 40/301 |
| 4,646,455 | 3/1987 | Gardner | 40/301 |
| 4,653,208 | 3/1987 | Wassillieff | 40/301 |
| 4,666,436 | 5/1987 | McDonald | 604/198 |
| 4,691,458 | 9/1987 | Scott | 40/300 |
| 4,694,781 | 9/1987 | Howe | 40/301 |
| 4,696,119 | 9/1987 | Howe | 40/301 |
| 4,718,374 | 1/1988 | Hayes | 40/301 |
| 4,741,117 | 3/1988 | Fearing | 40/301 |
| 4,748,757 | 6/1988 | Howe | 40/301 |
| 4,750,284 | 6/1988 | Parry | 40/301 |
| 4,780,039 | 10/1988 | Hartman | 411/533 |
| 4,785,563 | 11/1988 | Friedman | 40/301 |

Primary Examiner—Peter R. Brown
Assistant Examiner—James M. Gardner
Attorney, Agent, or Firm—Hana Dolezalova

[57] ABSTRACT

A new and improved animal identification ear devices assembly consisting of a novel rivet, a flexible base having rib-like reinforcement ramps, an animal ear tag and an applicator tool. The flexible base allows the rivet and the tag to move forward when mounted through the ear, until the reinforcement ramps bend together, locking and stiffening the rivet and preventing it from being pulled through the animal ear.

9 Claims, 14 Drawing Sheets

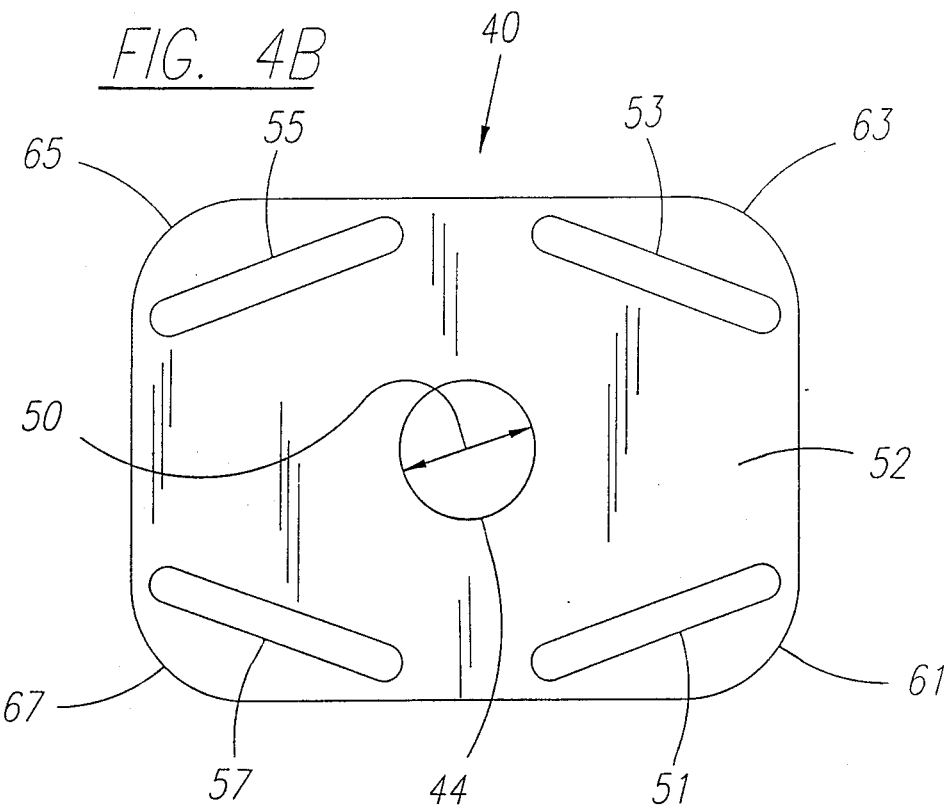
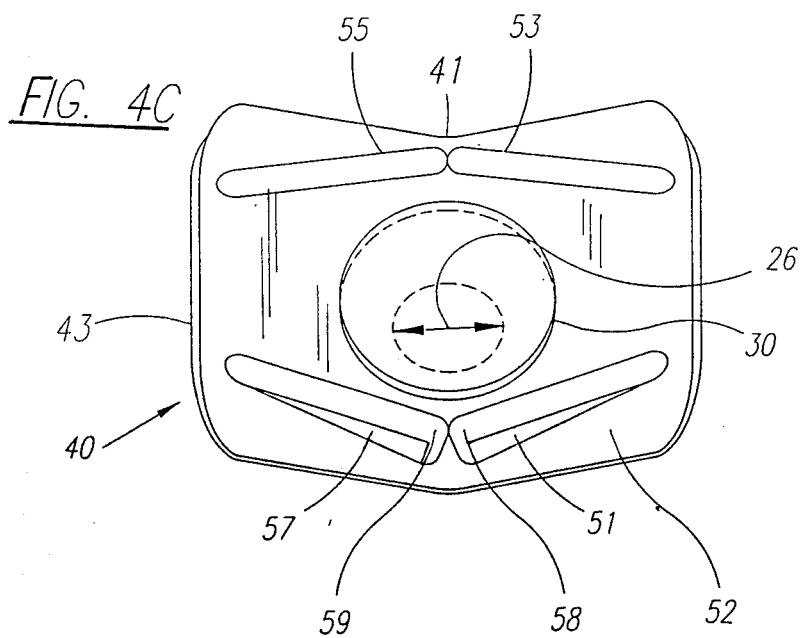

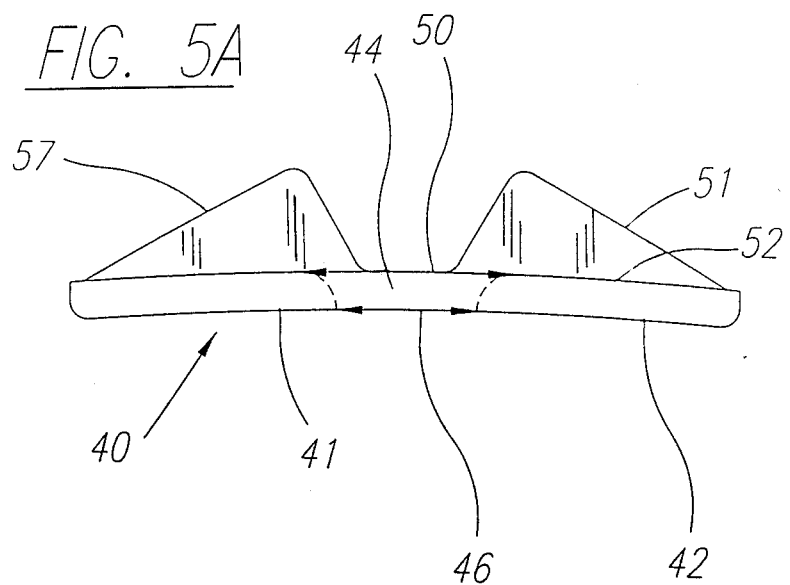
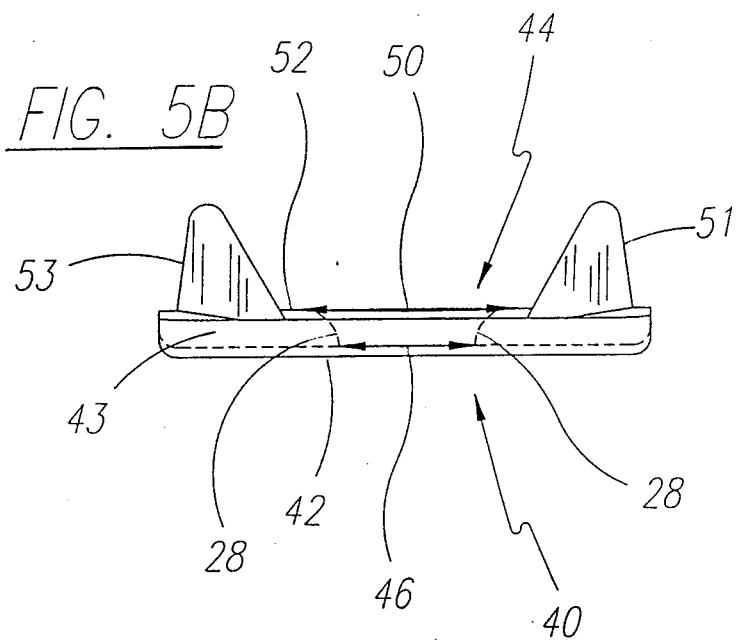

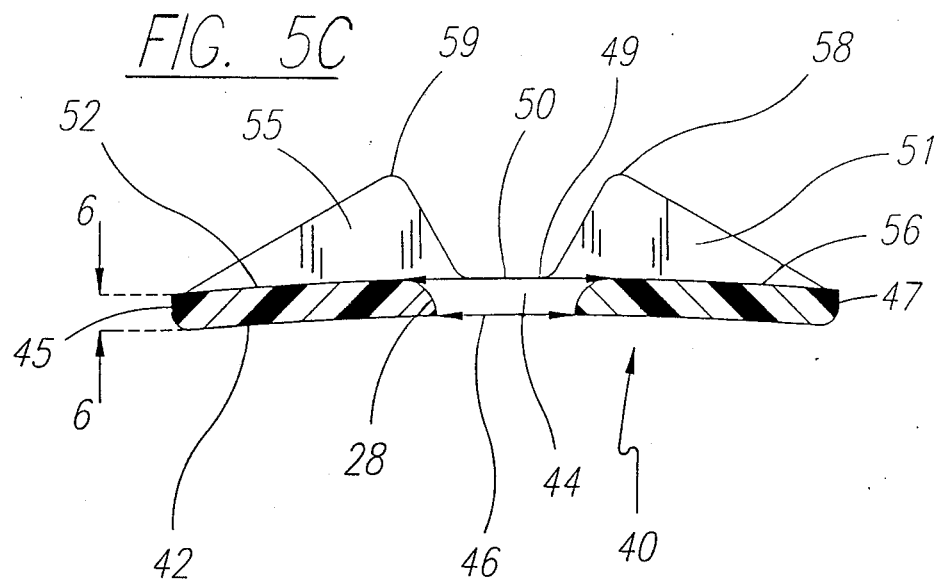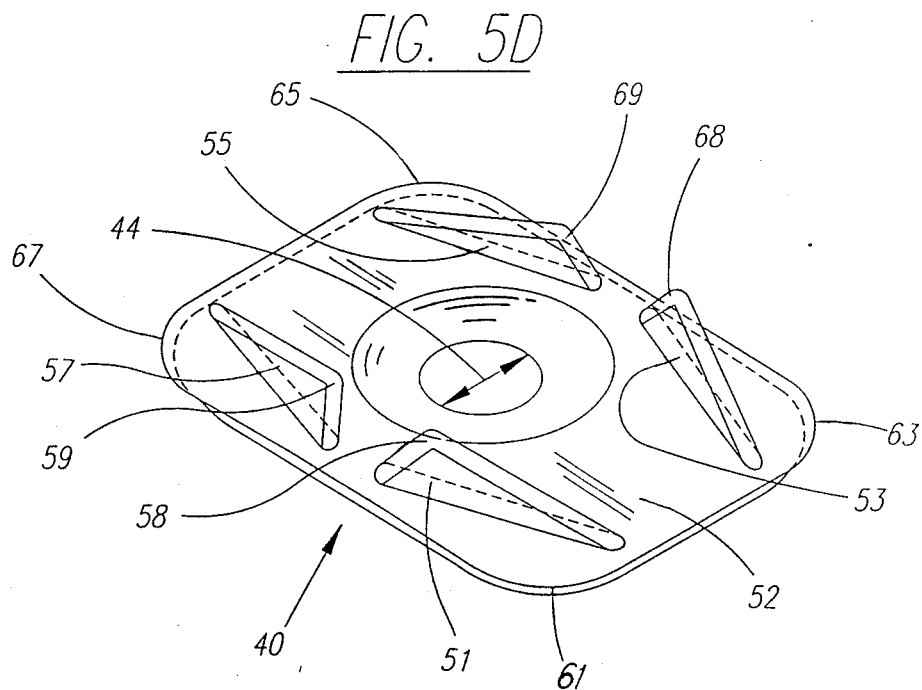

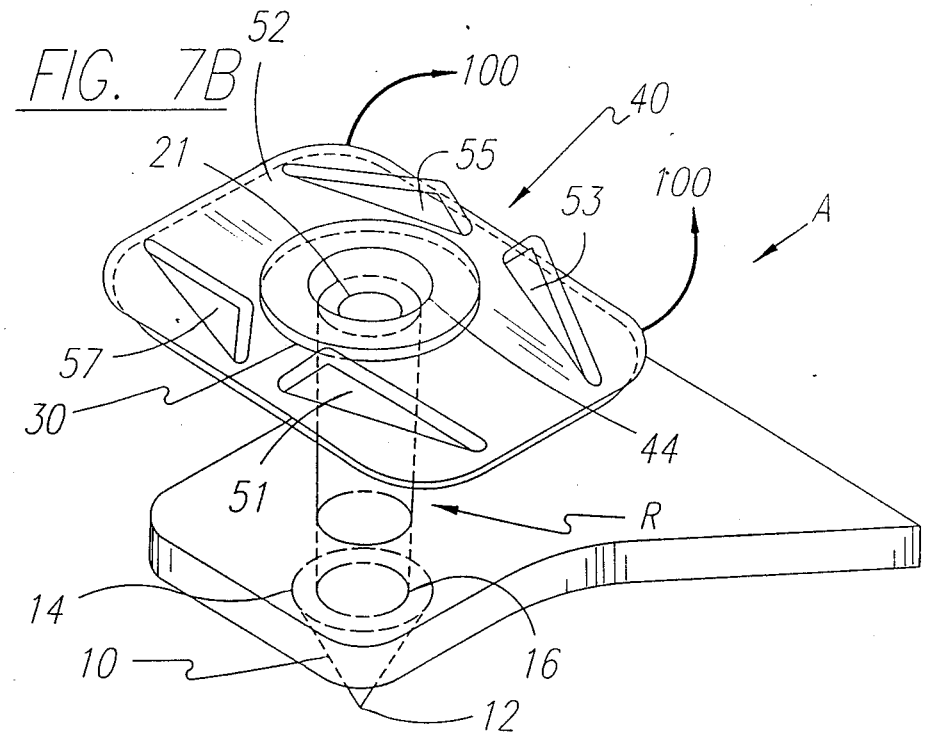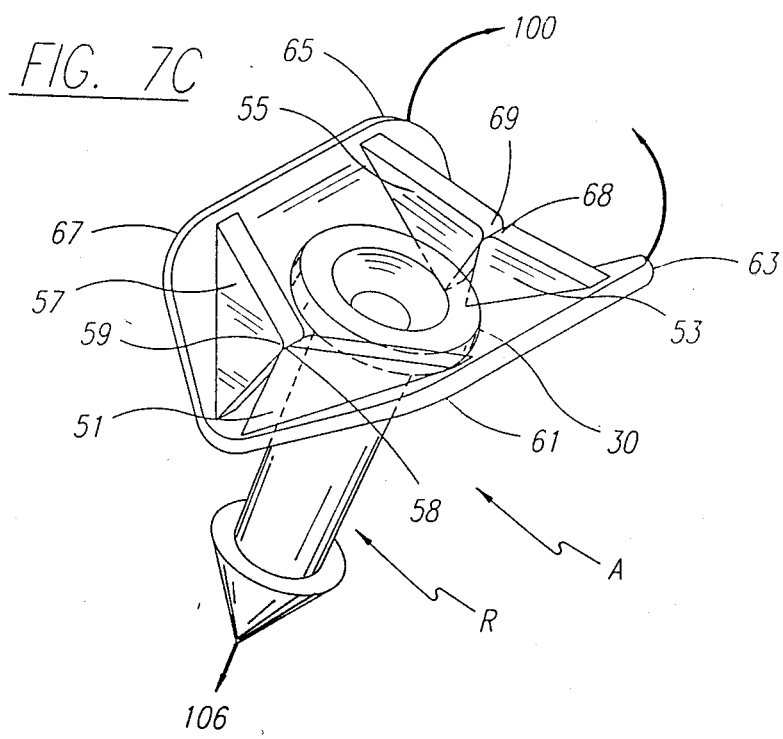

ANIMAL IDENTIFICATION EAR TAG ASSEMBLY

BACKGROUND OF THE INVENTION

1. Field of the Invention

The present invention relates to animal identification devices and more particularly to a new and improved ear tag assembly comprising a rivet, a novel flexible base having rib-like reinforcement ramps, an animal ear tag and an applicator tool.

2. Related Disclosures

One, two or three-piece animal ear tags are known and have been used for considerable time to identify animals (U.S. Pat. No. 4,785,563) in particular life-stock (U.S. Pat. No. 4,694,781 and U.S. Pat. No. 4,646,455, among others) by various means of identification devices, to deliver various chemicals or therapeutic agents (U.S. Pat. No. 4,721,064), to allow attachment of electronic identification means (U.S. Pat. No. 4,718,374) or even as an animal jewelry.

While the ease of attachment or mounting to the animal ear varies with various designs, an overall problem remains unsolved when, in particular in two-piece tag, the pin attaching the identification tag through the ear is and must be made of hard material. The base of the pin, which by necessity comes into repeated contact with the animal ear during the movement of the animal's head or ear remains rigid and with time irritates the place where the base is mounted and consequently causes the skin irritations, bleeding or infections. Moreover, the hard base of the pin tends to get caught or comes in continued contact with vires, fences, staunchion bars, pipes, branches and such other obstacles and, such base of the pin being inflexible, is being pulled, when caught, and may pull with it the pin and the tag, which may break and get lost or serious injuries and/or loss of the identification tag may be caused by the pulling out the pin through the ear.

Another problem generally associated with two-piece tag is the possibility of tampering.

Thus, it would be extremely valuable to have an identification ear tag assembly which would be easily attachable to the animal but which at the same time would have some means to prevent or minimize injuries to the animal's ear and surrounding tissue caused by movement and rubbing of the ear by the hard base of the pin or, in the event the base is caught and animal attempts to free itself, by the animal's tearing its ear or loosing the tag. It would also be very valuable to have a assembly which would be tamper-evident.

The above listed disadvantages have been recognized and attempts were made to provide a tag or system which would avoid or alleviate these problems.

For example, U.S. Pat. No. 4,209,924 describes a tag which can be lockingly abutted to the rear portion of the flanged impaler made of two materials; hard material is used for the impaler tip which is then embedded in the softer material used for the rest of impaler. While the impaler of this invention may somehow reduce the irritation of the ear by being made of the soft polyurethane, nevertheless its base has generally a predetermined, nonflexible, unmovable and unchangeable shape and thus rubs against the animal's ear all the time at the same place. That place then becomes sensitive, sore and rush and irritation or infection may consequently develop.

Another disadvantage of the patented tag is that the impaler must be made of two materials which makes its manufacturing and production more complicated, laborious and costly. Furthermore, the hard impaler tip may become dislocated from the soft material prior or during ear tag application.

U.S. Pat. No. 4,741,117 describes another attempt to deal with a possible injury of the animal ear. It describes a tag having a stud for piercing the ear of an animal which stud has a slightly tapered or straight hollow shaft with an ear-piercing conical tip on one end of the shaft and a set of three retaining flanges which extend radially on the other end. The whole shaft, including flanges, are made of hard but resilient material. Attached to the back of the flanges is an annular flexible disk made of a flexible material which, when attached to the wing-like flanges acts as a muscle flexor and assists in pulling the flanges back after they have been snagged. The flanges and flexible disk are in rigid position and cannot move along the shaft; their flexibility being of any use only in cases when the flanges get caught in some obstacle, when they bend, and hopefully get released. However, due to the resiliency of their hard material composition, these flanges lack the flexibility to return to the starting position on their own. Thus, the flanges will return to their original position only by means of the flexible disk. Thus, there is a great impracticability in manufacture of the two-pieces two-materials studs with flanges depending on the properly functioning flexible disk.

Another attempt to prevent injury and infection of the animal's ear is disclosed in U.S. Pat. No. 4,696,119 which describes an ear tag with a plurality of passageways made on the surface of the tag to permit flow of the outside air to the area of the ear perforation made during the tag insertion. This system has a pin with rigid affixed base embedded in the soft polyurethane material to make the contact of the base with the ear softer.

The pin is made of two materials and provides essentially no flexibility when the tag is caught in some obstacle. The base embedded in the polyurethane is not flexible and thus it is the function of the polyurethane to soften the impact of the rubbing the base over the surface of the ear. For that purpose, the perforations are made in the same area on the tag to allow the air circulation and healing of the wound or preventing the infection from the rubbing of the pin in the ear perforation. The primary disadvantage os this patent is that the manufacturing of the pin made of the two materials is more expensive and laborious than the manufacture of two separate pieces made of different materials.

Thus it would be greatly advantageous to have an identification tag assembly which would be comfortable for the animal to wear, which would be easy to apply to the animal's ear, and at the same time relatively inexpensive and easy to manufacture. It would be also desirable for the assembly to have a means allowing easy release of the tag from the obstacle without at the same time loosing or destroying the tag, injuring the animal or permitting undetected tampering.

The current invention provides the identification tag assembly which has all above listed advantages. It is easy and cheap to manufacture and easy to apply it quickly to the animal's ear. It is safe and comfortable to wear, and still allows an animal to get released from the accidental engagement with branches, fences, pipes, stanchions, vires or other obstructions and hindrances. In certain embodiments, a tampering is easily detectable and evident.

SUMMARY

A primary object of this invention is to provide an animal identification tag which is safe, comfortable, economical, tamper-evident and which allows animal to disengage itself from the obstructions or hindrances.

Another object of this invention is to provide the assembly comprising of the tag with an identification indicia, a rivet for connecting the tag to the animal, a flexible base movably attached to the shaft of the rivet and providing (a) means of protection against ear injury by constant rubbing of the ear with a hard button-like disk of the rivet, and (b) flexible means for disengaging the rivet in the event of incidental engagements with other objects.

Yet another object of this invention is the utilization of existing tag applicators for inserting into the animal's ear the tag assembly of the current invention.

Still another object of the current invention is to provide a new method to prevent the injury to the animal's ear during normal wear, or during attempts to free itself from the obstacles.

The current invention provides practical, durable, tamper-evident, easy to install, safe, nonirritating and economical animal ear tag assembly. The tag assembly comprises a novel type of rivet mounted with a slightly movable novel base equipped with reinforcement ramps. The base is attached integrally to the stem of the rivet. The rivet has a stem with a head at one end and a button at the other end. The rivet can be made generally of one piece molded of hard plastic material which is suitable for and able to withstand the thrust and penetration through the animal's ear and of which the stem remains inserted in the smaller aperture made in the ear and of which a portion attached and close to the rivet's head is surrounded by the strengthened neck of the tag through which the head of the rivet is attached. The rivet is further made in such a way that it can utilize currently existing applicator tools. In this respect, the rivet has an internal annular cavity (a hollow) of decreasing or constant diameter initiating as an opening in the middle of the disk and reaching to about middle of the rivet's head, shape and size of said hollow corresponding to the shape and size of the pin of the applicator so that the pin of the applicator fits tightly into the cavity.

The rivet's head has a conical shape with a sharp tip which readily, using reasonable pressure applied by the closing of the applicator shoulders, penetrates the ear of the animal and the strengthened aperture in the neck of the ear tag. The ridge under the head is made in such a way that, following the insertion through the tag's neck, it closely fits together with the strengthened portion and the shape of the tag's neck. The rivet's stem is made of hard material and has a smooth outside surface. This feature allows the rivet to remain in the penetration slit in the animal ear made during insertion of the rivet through the ear. It also allows for faster healing of the penetration slit following the tag insertion since the surface of the stem is smooth and thus allows the movement of the rivet inside the healed ear without any undue irritation to the ear. As pointed out above, the disk is located at the opposite end of the rivet stem from the head. The disk is circular, thin and small and has a round button-like shape. Because of the protection afforded by the mounted base, the disk does not require a lot of mass and may be fairly thin as well as small. This feature allows for reducing the weight of the rivet, for reducing a chance to have a wire, pipe, branch or other obstacles caught between the disk and the base and also allows tighter closing of ramps around the disk providing yet another added advantage.

Around the stem of the rivet close to the rivet disk, there is movably attached a base made of flexible plastic material having a rounded rectangular shape with four mounted ramps serving as reinforcement ribs. The base has a dual function. First, it provides the safety barrier for the hard rivet disk not to come to contact with the soft back tissue of the animal's ear and not to irritate it with constant rubbing or impact. Second, it prevents the tearing and injury of the ear when the base is caught or snagged on the wire fence or some such other obstacle. If the tag is caught, the flexible base allows the rivet and tag to move forward until the ramps, functioning as reinforcement ribs, bend together, locking and stiffening the base and preventing the base and the surrounded disk from pulling through the animal's ear. The reinforcement ribs also act as protective ramps preventing the small diameter disk area of the rivet from continued impact with the head staunchion bars found generally in cattle processing and feeding areas.

The ear tag system, as presented here, is practical in that it utilizes existing tooling for manufacturing of the rivet, tag and base and also because it utilizes the tag applicator generally used in cattle industry for inserting the fastening pin or stud through the animal ear to attach the tag.

The system may be made also tamper-evident in that it will show and prevents any incidental or intentional attempts to remove the tag by closing the flexible base around the rivet's disk and by the reinforcement area in the tag's neck which closes around the rivet's stem but behind the rivet's head. Additional features to provide a tamper-evident tag may include a specially designed head of the rivet with means for irreversible locking of the tag around the head and/or stem of the rivet. In the tamper-evident version of the tag assembly, the tag is equipped with a cap including a cap insert with locking means which will irreversibly attach the head and/or stem of the rivet in the tag's insert. Such irreversible attachment cannot be dismantled without breaking the stem or head of the rivet providing thus evidence of tampering. Such tampering attempts or incidents will be promptly detected, since the tag or the base would have to be forcibly cut or otherwise removed in order to be disengaged from the hard rivet stem.

The tag/rivet/base assembly is easy to install, in fact as easy or more so than any such other existing system, since the base is premounted on the stem of the rivet prior to the rivet's use and the rivet/base combination can be premounted on the applicator prior to the tag attachment. Thus, the only rivet and tag need to be connected through the animal's ear during the actual application without any further special manipulation.

The current system is more safe and comfortable for the animal than existing tags with pins, impalers or studs. Their hard base generally scratches, brushes, rubs or impacts all the time on the soft ear tissue. Moreover, the bases of these pins are necessarily either too big in order to prevent their withdrawal from the ear thus enlarging the area of irritation by rubbing, or so small that they may be pulled through the ear when the tag is caught, thus causing the tearing and other injury to the ear.

The novel rivet/base assembly is also economical in that it does not require any special tooling or molding equipment for combining or molding together hard and soft materials or attaching additional softer structures such as flanges, ribs or some other materials to or around the base of the pin or stud, such as are required by the attempts described in the prior disclosures.

BRIEF DESCRIPTION OF DRAWINGS

In order that the invention may be more fully understood, preferred embodiments of the invention will now be described, by way of example, with reference to the accompanying drawings, in which:

FIGS. 4A-C are magnified views of the base wherein FIG. 4A is an innerside plan view; FIG. 4B is an outerside plan view showing the positions of the ramps in undisturbed position during the normal use; and FIG. 4C is the outerside plan view of the rivet in disturbed position with ramps locked around the disk;

FIGS. 5A-D are views of the rectangular base, wherein FIG. 5A is a side view of the longer side of the rectangular base, FIG. 5B is a side view of the shorter side of the base, FIG. 5C is a side cross-sectional view of the base and FIG. 5D is a perspective view of the outerside of the base, with at least two visible ramps in all four FIGS. 5;

FIGS. 6A-B are side elevational plan views of the rivet with mounted base, wherein FIG. 6A is a side elevational view of the rivet with a mounted base from the shorter side of the base and FIG. 6B is a side elevational cross-sectional view of the rivet with a mounted base from the longer side of the base;

FIGS. 7A-C are perspective views of the rivet with the mounted base and the rivet, wherein FIG. 7A shows the innerside perspective view of the base; and FIG. 7B shows the outerside perspective view of the base, FIG. 7C shows the tag assembly in disturbed state with the ramps locked around the disk with all ramps at least partially visible in all FIGS. 7.

FIGS. 9A-B are the front and the rear views of the tag mounted in the animal ear, wherein FIG. 9A is a front view of the tag attached through the animal's ear, and FIG. 9B is a rear view of the tag attached through the animal's ear with the rivet's disk and the base having the reinforcement ramps visible;

DETAILED DESCRIPTION OF THE INVENTION

The novel animal identification ear tag assembly A comprises three components: a tag T, a rivet R and a base 40. The assembly A is complemented with ear tag applicator 70.

The rivet R is a one piece molded or made of rigid or semirigid material such as PVC, nylon, metal, wood or such other similar materials. The material used should preferably have sufficient hardness to permit piercing the animal ear.

Figure 1:
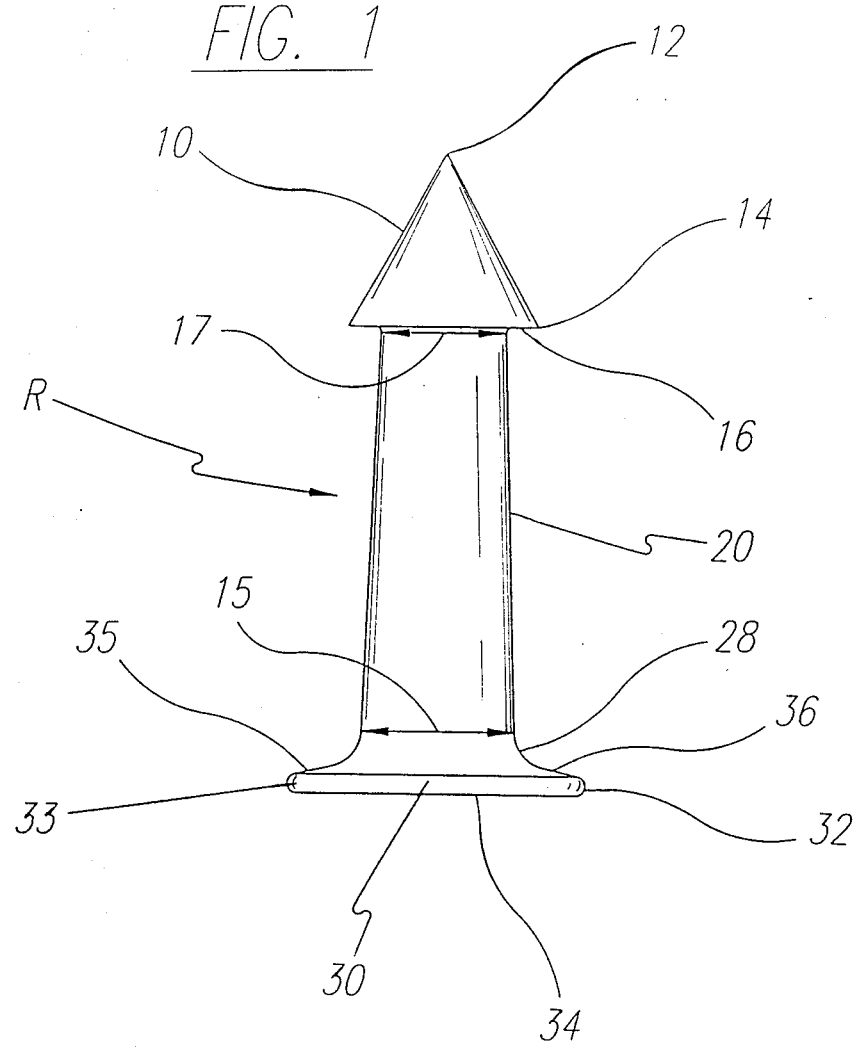
FIG. 1 is a side elevational view in enlarge scale of a rivet made in accordance with the present invention.

As illustrated in FIG. 1, the rivet R includes a conically pointed head 10, a stem 20 and a disk-like bottom portion 30. The head 10 has an ear-piercing point 12 with circumferential edge 14 forming a ridge 16. The head 10 may be of any convenient size and diameter, the largest diameter of the head is preferably 0.320" and the height of the head 10 is preferably 0.285". The stem 20 is slightly tapered, depending on the convenience and intended use, with upper diameter 17 of the tapered ridge 16 being preferably 0.209" and lower diameter 15 of the tapered stem being preferably 0.256". Nontapered cylindrical stem and stem with stepwise increasing diameter also contemplated under the current invention have diameters around and between 0.150" to 0.300" with stepwise increasing diameter stem having the smallest diameter 17 at a ridge 16 site and the largest diameter 15 at a site of stem evolving into disk 30. The disk 30 located on the end of the stem 20 opposite the head 10. The size of the disk can vary from 0.320" to 0.800" depending on the intended use but for the purposes of this invention it is preferable that the disk 30 is as small and as light as possible to decrease the weight of the tag assembly but primarily to allow the disk to be retained and surrounded by the flexible base 40. Typically, the outer dimensions of the disk will be between 0.350" to 0.580" and most preferably about 0.500".

The stem 20 extends toward the disk portion 30 into a generally conically shaped connecting member 28. The member 28 has a concave outer surface curvature 36 of about 0.062 R. However, other curvatures can also be used. A base 40 hole 44 (FIG. 4A) is complementary and may have corresponding fitting convex angle to the curvature 36 as shown in FIG. 6B. The outer edge 32 of the disk has typically radius 33 of 0.032 R but can have right or any other angles or curvatures as needed. The angle of the slope between the upperside 35 and the bottom 34 of the disk is typically about 13° but may be smaller or larger or even the right angle, if desirable.

The height of the rivet from the pointed tip 12 to the bottom 34 of the disk 30 is typically around 0.800" to 1.500", preferably around 1.000".

Figure 2:
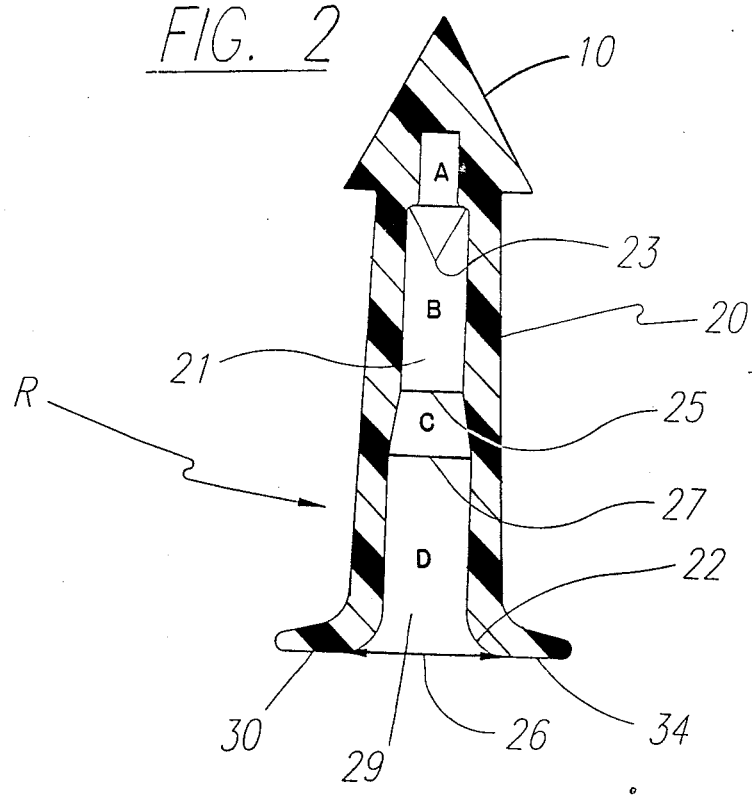
FIG. 2 is a cross-sectional side view of the rivet of FIG.1 in enlarged scale.

FIG. 2 shows a cross-sectional view including the interior of the rivet R. The interior of the rivet has a hollow chamber 21 which is typically formed to complement the size and the shape of the applicator's pin 72. In this instance, the pin 72 is formed of metallic cylindrical sections A, B, C and D of decreasing diameters. The largest diameter 26 of the section diameter D is the one at the bottom 34 of the disk 30 and the smallest diameter 27 of the section D is where the section is bordering section C; the conically narrowing section C connects section D to section B. Narrowing of the section C from diameter 27 to diameter 25 is usually from 7° to 9°. Section B is located in the upper part of the rivet stem 20 and is connected through fillets 23 with the narrowest section A. Section.A is positioned in such a way that it protrudes into the rivet's head 10.

Figure 10:
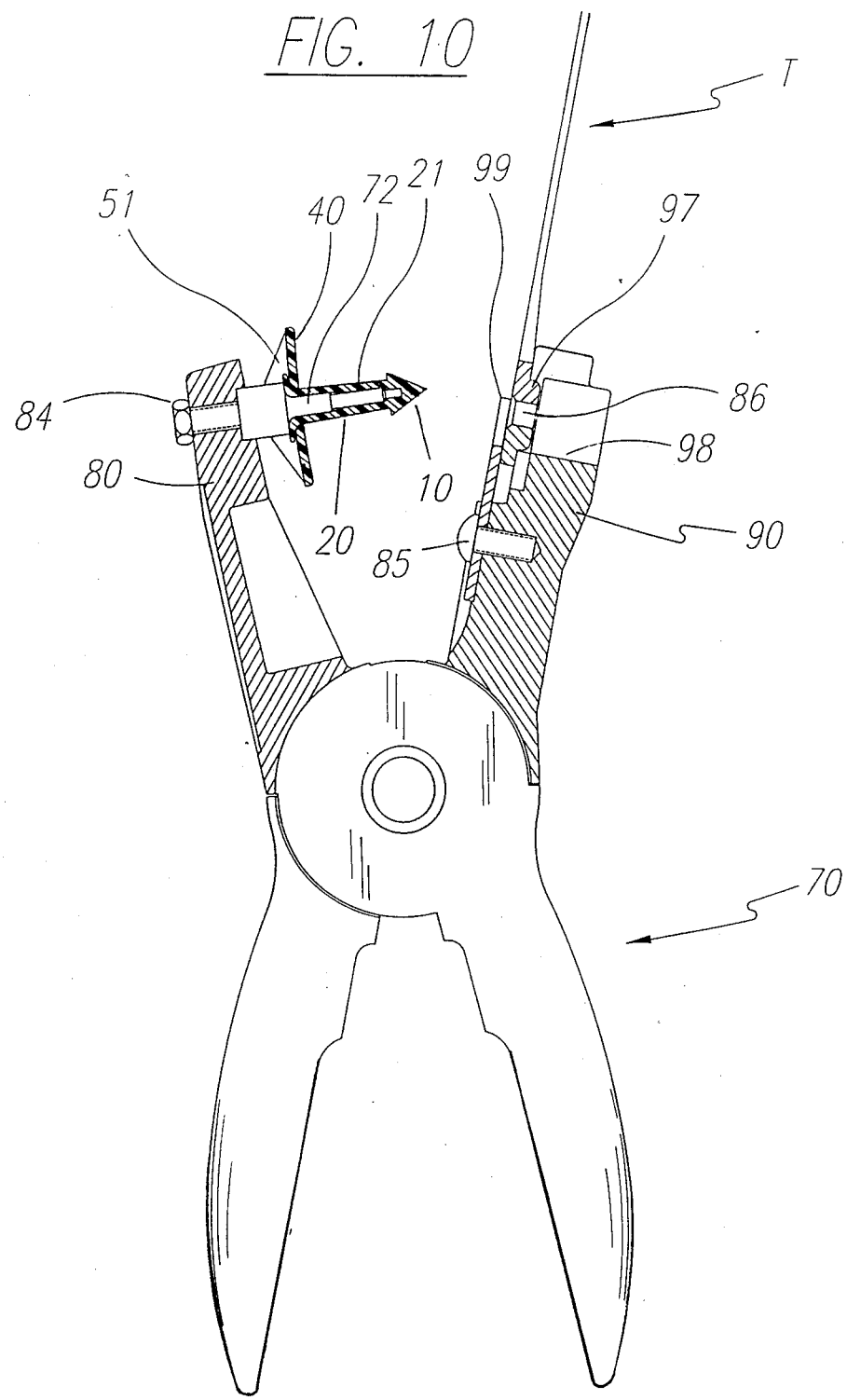
FIG. 10 is a cross-sectional view of an applicator in open position, with the rivet and tag mounted therein, prior to installation of the rivet and tag in the ear of the animal.
Figure 11:
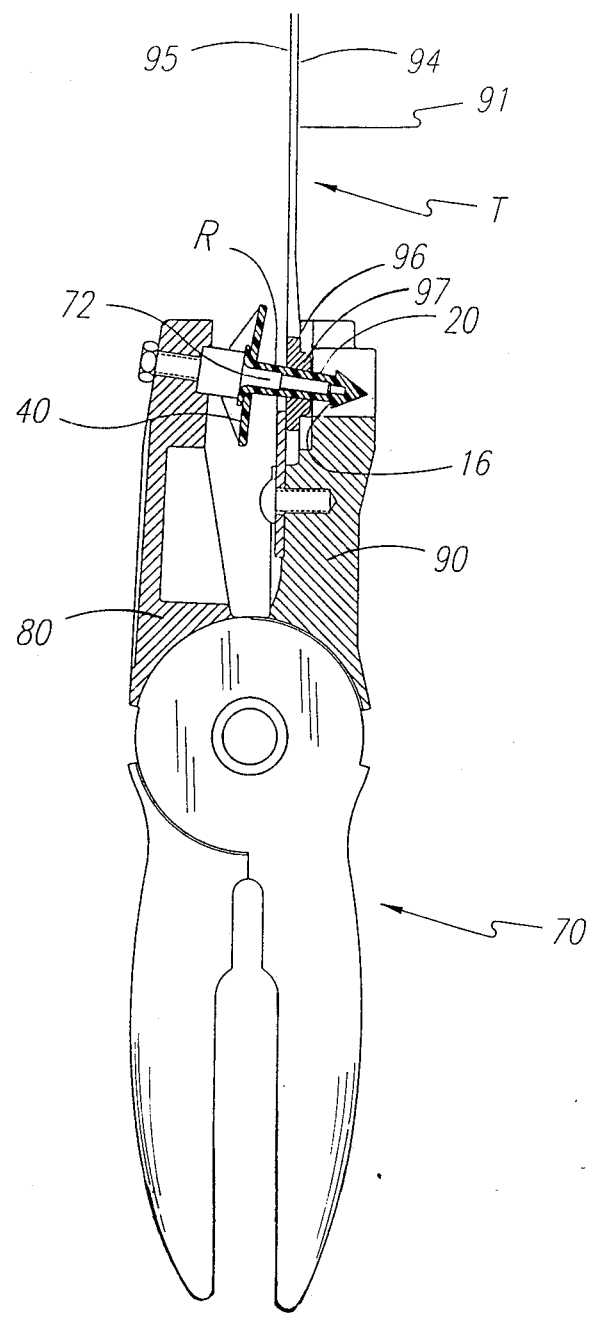
FIG. 11 is a cross-sectional view of the applicator in a closed position, with the rivet and tag still mounted in the applicator but showing a mutual relationship of the rivet, tag and the base after the installation.

Typically, the section A has diameter within 0.050 to 0.080", preferably 0.063"; section B has diameter between 0.080" to 0.120", preferably 0.106"; section C has upper part diameter 25 equal to diameter of section B and lower part diameter 27 equal to the diameter of section D. Section D starts at 27 and is for the most part cylindrical with diameter between 0.120" to 0.200", preferably 0.143" terminating with broadest diameter 26 to up to about 0.350", depending on the shape of the applicator pin 72. The section D is generally connected with outside by opening 29 of the diameter 26. The diameter 26 of the opening 29 is larger than the upper diameter 27 of the Section D. The reason for this is that the opening 29 allows the entrance of the pin 72 of the applicator 70 (shown in FIG. 10) into the hollow 21. The pin 72 of the applicator 70 has a complementary shape to the hollow 21 as shown in FIGS. 10 and 11. The opening 29 generally has a curved walls 22 utilizing a radius of, but not limited to 0.070 R. This particular design of the hollow 21 was found to provide the most endurance against incidental breakage of the rivet's R material and also to allow the use of a sufficient strength and power needed for penetration of the animal's ear E in one single thrust. The speed and ease of the attachment of the tag to the animal and the necessity of using only one single thrust to insert the rivet R through the animal ear and connect it with the tag T on the other side is of the utmost importance. This requirement is in particular very important as there is usually great number of cattle to be tagged at any given time and it is impractical if not impossible to subdue them or to submit them to more then one snap when inserting the tag.

It is however, understood, that all designs falling within the scope of this invention, including those where the stem 20 and the hollow 21 of the stem 20 are conically tapered or straight are contemplated to be covered by this invention.

Figure 3:
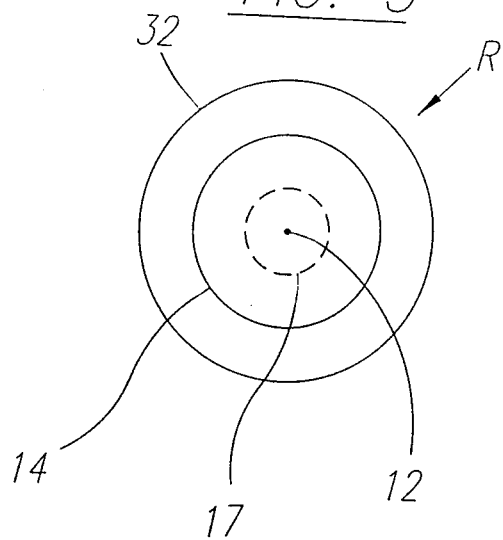
FIG. 3 is a top plan view of the rivet's head in enlarged scale.

FIG. 3 is the top view of the rivet R without base 40, showing the approximate relationships between conical tip 12, circumferential edge 14, the upper diameter 17 of the stem 20 and the largest circumferential outer edge 32 of the rivet disk 30.

FIG. 4 shows the base 40. The base 40 has typically two or more, preferably four reinforcement ramps positioned in such a way as to achieve the largest benefit during their locking function.

Figure 4A:
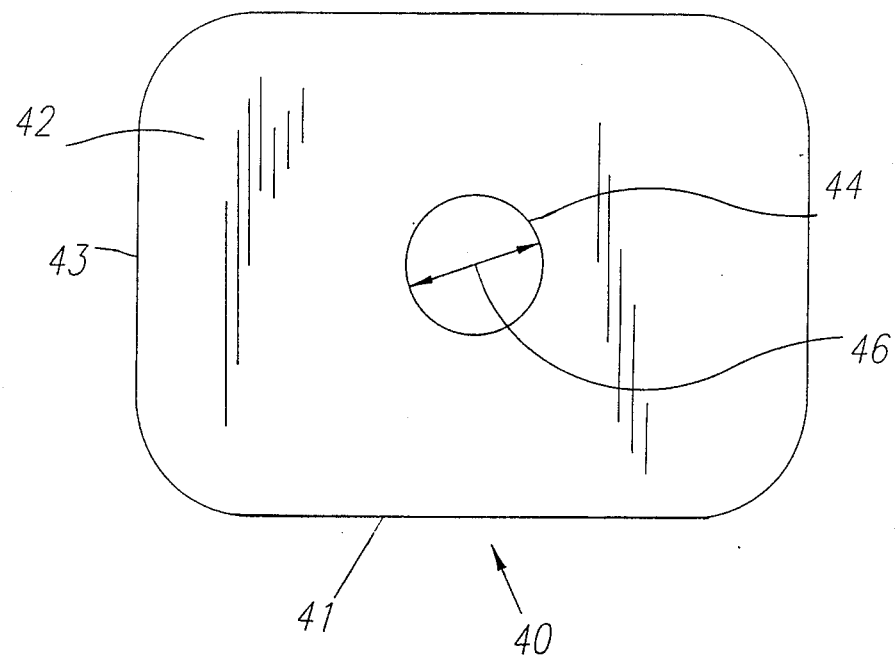

FIG. 4A is a magnified innerside plan view of the base 40 with longer side 41 and shorter side 43. The term innerside 42 as used herein means the side of the base 40 which faces toward the animal's ear. The term outerside 52 as used herein means the side of the base 40 which faces away from the ear. The innerside 42 of the base 40 has a hole 44 for mounting of the base 40 around the stem 20 of the rivet R (not shown). The innerside 42 faces the head 10 of the rivet R and when the rivet R is inserted through the animal ear, it faces toward the ear lobe. The base 40 is made of soft and flexible material such as flexible plastic, preferably polyurethane and can bend in both directions. The use of the soft plastic material for the base 40 has a dual function. First, the innerside 42 of the base 40 needs to be smooth and soft so that it does not irritate the animal's ear skin tissue even when repeatedly touching or rubbing the skin, but it is flexible enough to shape itself according to the shape of the ear E. The most preferred base embodiments of this invention have typically concave shape complementary to the shape of the rear side of the ear. Second, because it is made of flexible plastic, it can move freely along the stem 20 of the rivet R and bend and/or distort itself if snagged or caught in any obstacle. In an effort of the animal to free itself from the catching obstacle, the flexible base 40 will allow the rivet R and the tag T to move forward until the reinforcement ramps 51, 53, 55, and 57, shown in FIG. 4B and FIGS. 5, bend toward each other and together forming a four piece ramp lockup around the rivet R disk 30, preventing the base 40 from pulling through the animal's ear.

The ability to almost completely prevent the catching or retention of wires, pipes, branches or other obstacles in between the base 40 and disk 30 or in between the ear E and the base 40 due to the concave shape of the base 40 is an added advantage. That property combined with the backwards flexibility of the concave ear shaped base 40 and the forceful locking of the ramps 51, 53, 55 and 57 around the disk 30 of the rivet R assure that almost always the caught obstacle will be released due to the sliding of the obstacle along the smooth innerside 42 of the base bended outward in direction 100 as seen in FIG. 7C.

The innerside 42 of the base has a hole 44 with the diameter 46 of the same or slightly smaller diameter than the stem 20. In any case the diameter 46 of the hole 44 is always smaller than the rivet disk 30.

Generally, the base 40 has a rectangular shape with rounded corners 63, 65, 67 and 69. The longer side 41 of the base 40 has a length from 0.80" to 1.4", preferably around 1.16" and the shorter side 43 has length from 0.60" to 1.0", preferably 0.85". The diameter of the hole 46 is between 0.250 to 0.300 and, its diameter depends on the size and diameter of stem 20. The thickness of the base 45 taken between 6—6 is between 0.05" to 0.10", preferably around 0.0625". However, the other shapes of the base, such as circular, oval, square or any other suitable shape, are also contemplated to be within the scope of this invention. All bases, regardless of their shape, have preferably rounded corners and smooth edges.

The outerside 52 of the base 40 shown in FIG.4B and 4C is generally of the same size as innerside 42 but may be slightly larger when there is a smaller than right angle from the outerside 52 to the innerside 42 or slightly smaller when there is a bigger than right angle from outerside 52 to innerside 42. The outerside 52, of course, also has the hole 44 at about geometric center of the base 40 for retainment of the stem 20 of the rivet R (not shown) and the diameter 50 will depend on the diameter of the stem 20. In case of non-tapered stem, the diameter 50 of the hole 44 could be the same as the diameter 46 of the innerside hole 44 (FIG. 4A). Nevertheless, it is more usual to have the diameter 50 of the upperside hole 44 larger than the innerside diameter 46 of the hole 44, in particular since the connecting member 28 between the stem 20 and the rivet's disk 30 has a curvature 36 (FIG. 1) and thus it may be to an advantage to have the inner diameter 50 of the hole 44, shown in more details in FIGS. 5A, 5B and 5C, to have a converse shape to that of connecting member 28.

Also shown in FIG. 4B is the outerside 52 of the base 40 with fixedly attached four ramps 51, 53, 55, and 57. These ramps are either molded as one piece with the base 40 or are attached to it parallel to a diagonal of the base on all four corners. The ramps 51 and 55 are oppositely disposed and extended parallel to one another and to the diagonal extending from the corner 63 to the corner 67. The ramps 53 and 57 are oppositely disposed and extended parallel to one another and to the diagonal extending from the corner 65 to the corner 61.

All four ramps 51, 53, 55, and 57 are of the same size and shape and are positioned parallel to each other on two diagonally opposing corners of the base. FIG. 4C is a perspective view of the outerside 52 of the disturbed base 40 mounted around disk 30 wherein the ramps 51, 53, 55, and 57 are lockingly closing around the disk 30, the base 40 is bent away from the animals ear in the middle of the longer side 41. Consequently, in this position, the base looks like if it has a square shape. The disk 30 is positioned in the middle of the disturbed base 40 with ramps 51, 53, 55 and 57 in locked position around the disk 30. Also shown in this FIG. 4C are pointed corners 58 and 59 of ramps 51 and 57, respectively, in their locked position. The shape of the ramps 51, 53, 55, and 57 is shown in FIGS. 5A, 5B, 5C and 5D. The shape is typically the same for all ramps and is generally a rounded triangle scalene. However, other shapes of the ramps and combination of the shapes for ramps is also within the scope of this invention.

FIGS. 5 are the side and perspective views of the base 40. For better illustration, in all FIGS. 5 the outerside 52 faces up and the innerside 42 faces down.

FIG. 5A shows a side view of the longer side 41 of the base 40 with side views of the ramps 51 and 57. Also illustrated are the diameters 50 of the hole 44 on the upperside 52 of the base and the diameter 46 of the hole 44 on the innerside 42, relative to each other. FIG. 5B is a magnified side view of the slightly curved base 40 seen from the short side 43 having the hole 44 of the innerside 42 of diameter 46 and outerside 52 diameter 50 with radiuses 28. The radiuses 28 are generally 0.070 R. The side view of the ramps 51 and 53 are shown as seen from the short side 43.

FIG. 5C is a cross-sectional view of the base 40. The cross-section of the FIG. 5C is taken from the FIG. 5A and shows the outer edge 47 of the shorter side 43 of the base 40 showing the thickness 45 of the base between points 6—6, i.e. between outerside 52 and innerside 42. In the middle of the base 40, there is a cross-section of the hole 44 with the innerside diameter 46 and the outerside 52 diameter 50 showing radiuses 28 of the hole 44 opening to receive the pin 72 of the applicator 70 (FIGS. 10 and 11). The ramps 51 and 57 (shown) and 53 and 55 (not shown) have the shape of right-angled, scalene or obtuse triangle with rounded corners which are mounted on the base 40 in positions as shown in FIG. 4B.

Returning now to FIG. 5C, the rounded pointed corners 58 and 59 of each ramp 51 and 57, respectively, projects outside from the outerside 52 of the base 40. The actual length of the ramp's side from the pointed corner 58 to the attachment 56 of the ramp 51 to the base 40 is between 0.150" to 0.250". The length of the other side from point 58 to the attachment point 49 is between 0.050" to 0.100".

FIG. 5D is a perspective view of the outerside 52 of the base 40 with visible ramps 51, 53, 55, and 57 in undisturbed state. The ramps are positioned around the hole 44 parallel to diagonal of the base on all four corners facing the rounded corners 61, 63, 65 and 67. Two (51 and 55) and two (53 and 57) ramps are located at two opposite rounded corners (63 and 67), respectively, in parallel diagonal manner. The ramps rounded points 58, 59, 68 and 69 project upward.

Figure 6A:
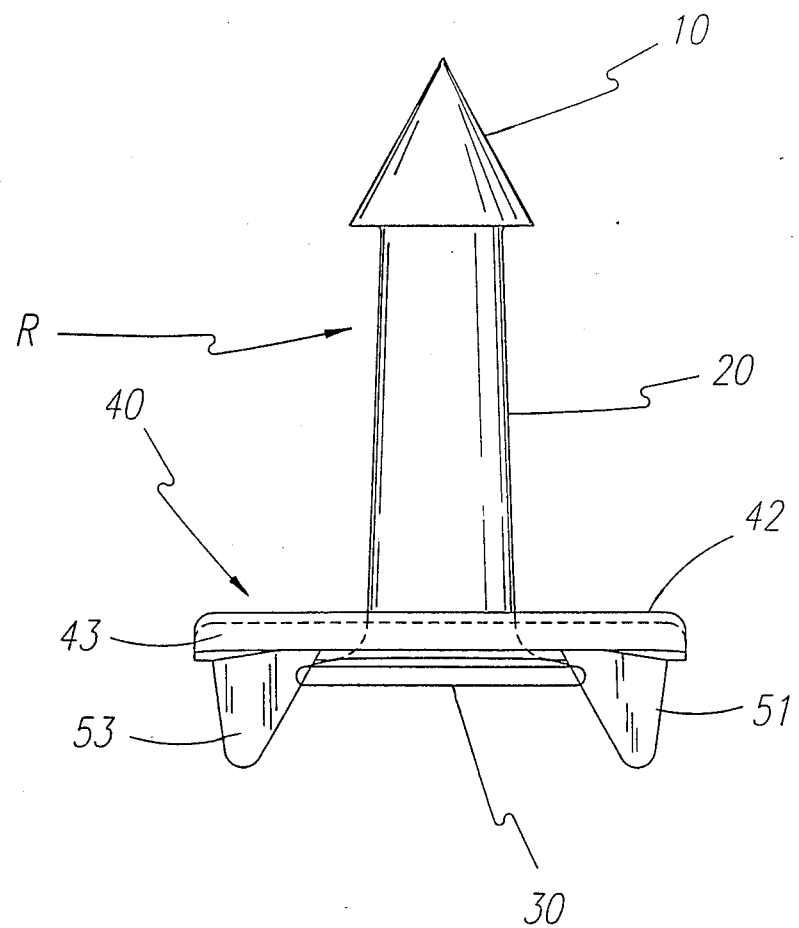
Figure 6B:
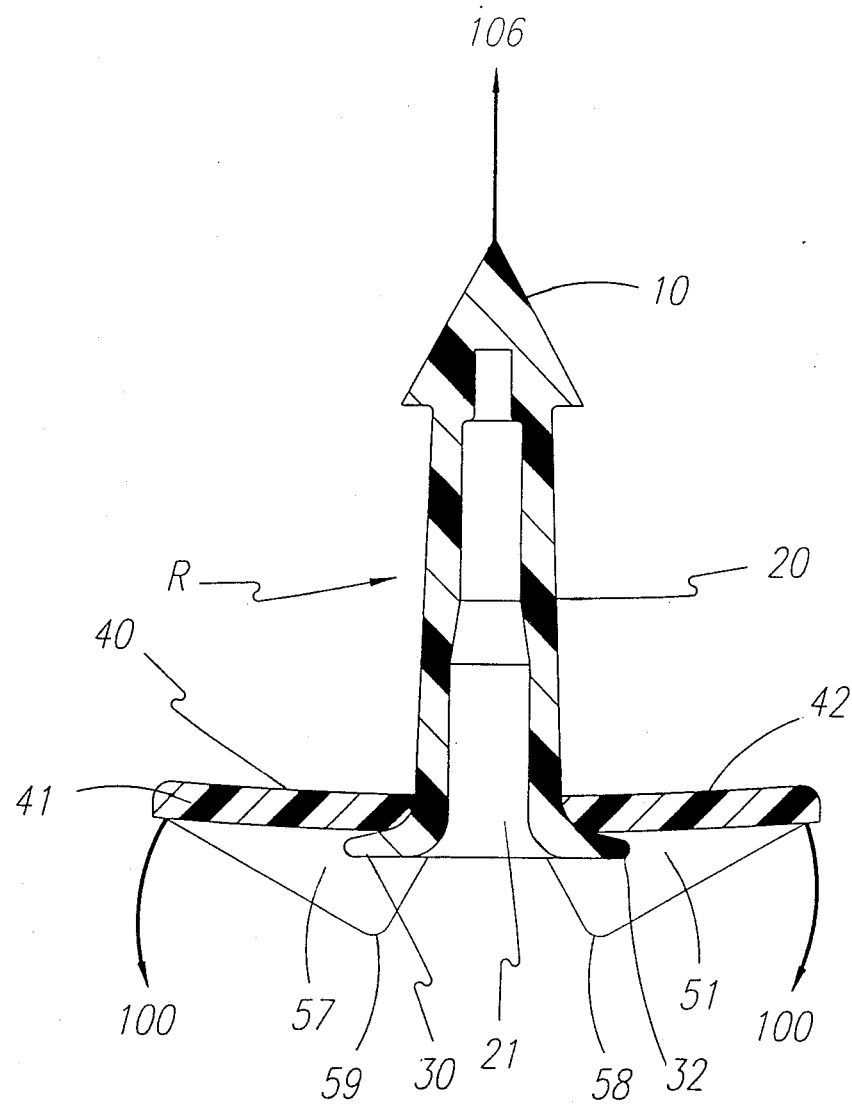

FIG. 6A is the side view of the rivet R and the base 40 showing how the base 40 is mounted around the stem 20 with the innerside 42 facing the head 10 of the rivet and the outerside 52 facing away of the head 10 of the rivet. Only two ramps 51 and 53 are visible in this view taken from the shorter side 43 of the base 40. The disk 30 is in fact situated in the middle of the four ramps 51, 53, 55, and 57 but in this view it is partly behind the visible ramps 51 and 53 and in front of the ramps 55 and 57, invisible in this drawings.

FIG. 6B shows the same cross-sectional view for the rivet R as shown in FIG. 2 with the mounted base 40 around stem 20. This view is taken along the longer side 41 of the base 40 and consequently shows the attached base 40 around the rivet R innerside 42 facing the head 10 of the rivet R. The hollow 21 is visible, with the disk 30 positioned respective to the ramps 51 and 57. Both FIGS. 6A and 6B are in an undisturbed position. If the tag would be caught, the rivet would be pulled in direction 106, the base would bend in opposite direction 100 of the pull and the pointed ends 58 and 59 (visible in this FIG. and 68 and 69 (not shown) of the ramps 51, 53, 55, and 57 will come together and close around the disk 30 and the corresponding corners 61, 63, 65, and 67 (not shown in this FIG.) also coming closer together around the disk 30. The enclosure will be complete with all four ramps closing almost like a fan around the disk 30.

Figure 7A:
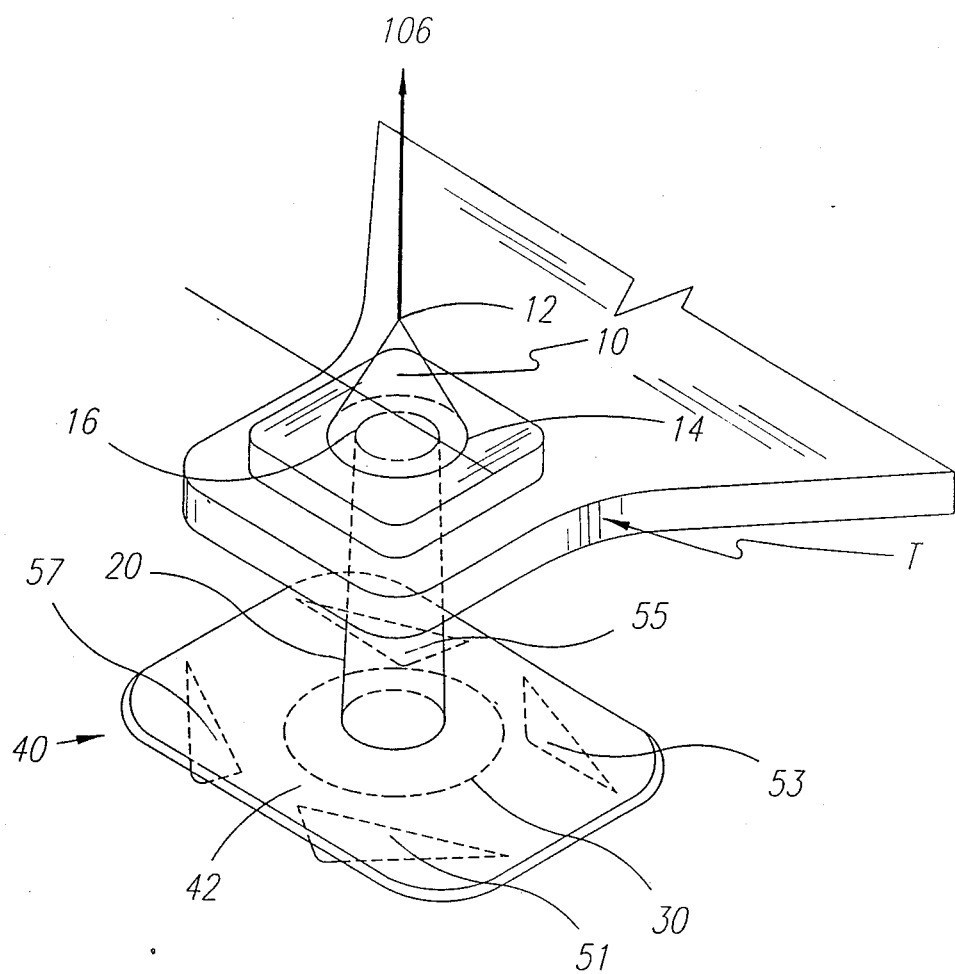

FIG. 7A is a perspective innerside view of the tag assembly in undisturbed state with the rivet R having the base 40 mounted on the stem 20 to be inserted in the ear E (not shown) with the tag T attached on the other side of the ear. Tag T is attached around the stem 20 of the rivet R. The head 10 with tip 12 pointing out and the tag T are on one side of the ear while the innerside 42 of the base 40 is on the other side of the ear. The stem 20 is inserted through the ear and connects the front side of the animal's ear where there is tag T and the head 10 and the rear side of the ear with the base 40 mounted around the disk 30. The disk 30 is surrounded by base 40 with four ramps 51, 53, 55 and 57. These ramps are better visible in FIG. 7B which is taken from the outerside 52 point of view. Here the base 40 is mounted around the stem 20 with protruding disk 30 surrounded by the four ramps 51, 53, 55, and 57. The FIG. 7B is in a nondisturbed state although the direction 100 in which it would be closing and locking disk 30 is shown. The hollow 21 is shown to be inside hole 44. Circumferential edge 14 and ridge 16 of the head 10 are abutting the tag T.

FIG. 7C shows the assembly in disturbed state. When the tag is caught and pulled in direction shown by an arrow 106, the base bends in direction shown by the arrow 100 and the ramps 51, 53, 55 and 57 close and lock around the disk 30 as visible in FIG. 7C. Pointed corners 58, 59, 68 and 69 of the ramps 51, 53, 55 and 57 close around the disk 30 and lock the disk 30 inside, preventing the impact and contact of the disk 30 with the back side of the ear. The rounded corners 61, 63, 65, and 67 of the base 40 come closer together when the base 40 bends in direction 100. The position of stem 20, disk 30, ramps 51, 53, 55 and 57 and the relative position of innerside 42 and outerside 52 toward the ear are also shown in disturbed tag assembly.

The rivet's stem 20 is left in the ear perforation P with the soft flexible base innerside 42 facing the ear E and the outer side 52 facing away from the ear with ramps surrounding the disk 30 and ready to bend and envelop the disk on any pulling movement forward.

In an emergency situation, when the tag T is caught, both the tag and the rivet R would slide through the ear in direction 106 of the obstacle. Then, the base 40 would bent in the opposite direction than the sliding movement of the rivet R, i. e. it would bend to the outerside direction and it would lock the ramps 51, 53, 55, and 57 around the disk 30 which will have been pulled with the rivet R following the tag in the inward direction 106 of the tag T. The soft flexible base 40 would be first pulled in the direction 106 of the tag until it would touch the ear. Then, because of the flexible plastic material it would not abut rigidly to the ear but it would bend in direction 100 and foreclose the disk 30 in its midst and the ramps 51, 53, 55, and 57 would surround it in the protective manner, preventing the disk 30 to impact on the ear and consequently a damage to the ear would be prevented. The foreclosed position of the tag assembly is shown in FIG. 7C with base 40 being pulled in directions 100 and the rivet R with disk 30 being pulled in direction 106.

The primary novel feature of this invention are the protective reinforcement ramps 51, 53, 55 and 57 attached to the base and oriented in such a manner that they provide the protective shield for disk 30 by bending together and encapsulating in their midst a disk 30, as shown in FIG. 7C. These ramps provide the protection for disk 30 in both disturbed emergency and nondisturbed state. In the disturbed state, as described above, they effectively lock the disk 30 within the four ramps and disallow any contact of the disk 30 with the outside of the ramps enclosure. In nondisturbed state, with base 40 being unbended and freely movable along the rivet stem 20, the ramps protruding away from the outerside 52 of the base 40 thus stand a guard against any casual contact with disk 30 so that, for example, a first impact of any brushing against or hitting the base 40 would be with protruding ramps and not with the disk. The protective ramps therefore provide general and emergency protection for disk 30 at any time.

Figure 8:
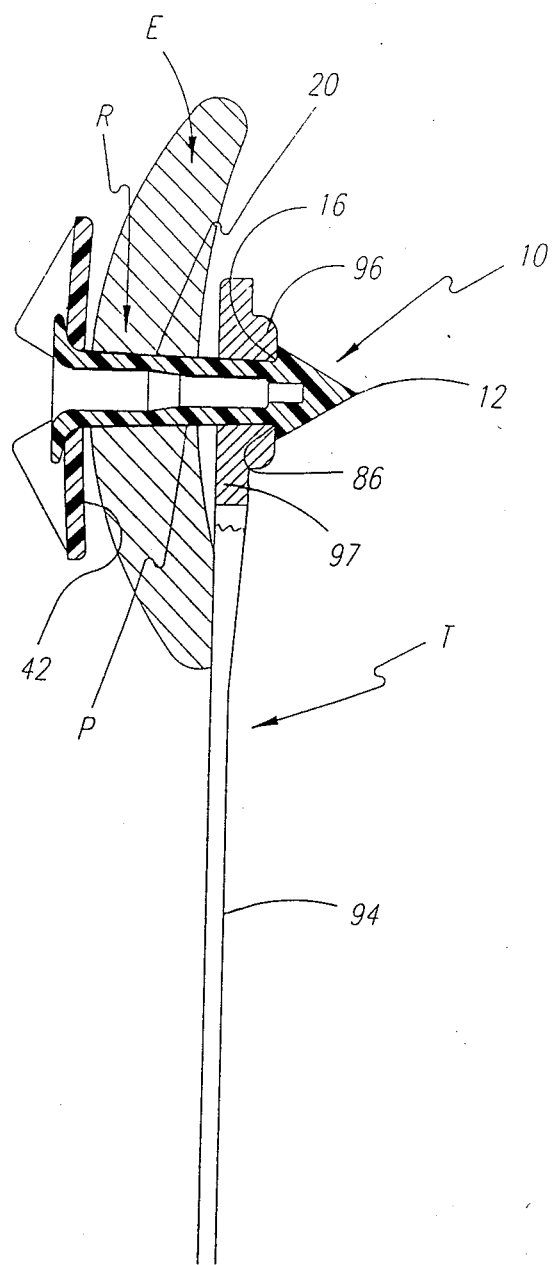
FIG. 8 is a magnified cross-sectional view of the tag assembly comprising the rivet with mounted base attached to the tag through the animal's ear.

FIG. 8 is a cross-sectional view of the tag assembly attached to the animal's ear E through the perforation P. The rivet R is inserted through the perforation P made by the pointed tip 12 of the head 10 using the applicator 70 shown in FIGS. 10 and 11. Using one single thrust the head 10 pierces the ear and is also inserted through the doubly reinforced area 97 of the strengthened neck 96 of the tag T. The neck 96 has an opening 86 smaller than the head 10 of the rivet R which opening is forcefully dilated during the insertion of the head 10 through the perforation P due to the assertion of certain pressure during the tag attachment. The opening 86 in the neck 96 of the tag T will temporarily dilate due to limited flexibility of the material used to make the doubly reinforced area 97 of the tag T. Immediately when the head 10 of the rivet R is passed through, the opening 86 of the area 97 it will close around the stem 20 of the rivet R and stay closed until there is either incidental or attempted breakage. There is a tight fit between the ridge 16 of the head 10 and the reinforcement 97 of the neck 96. The tag T is then attached to the animal's ear.

Figure 9A:
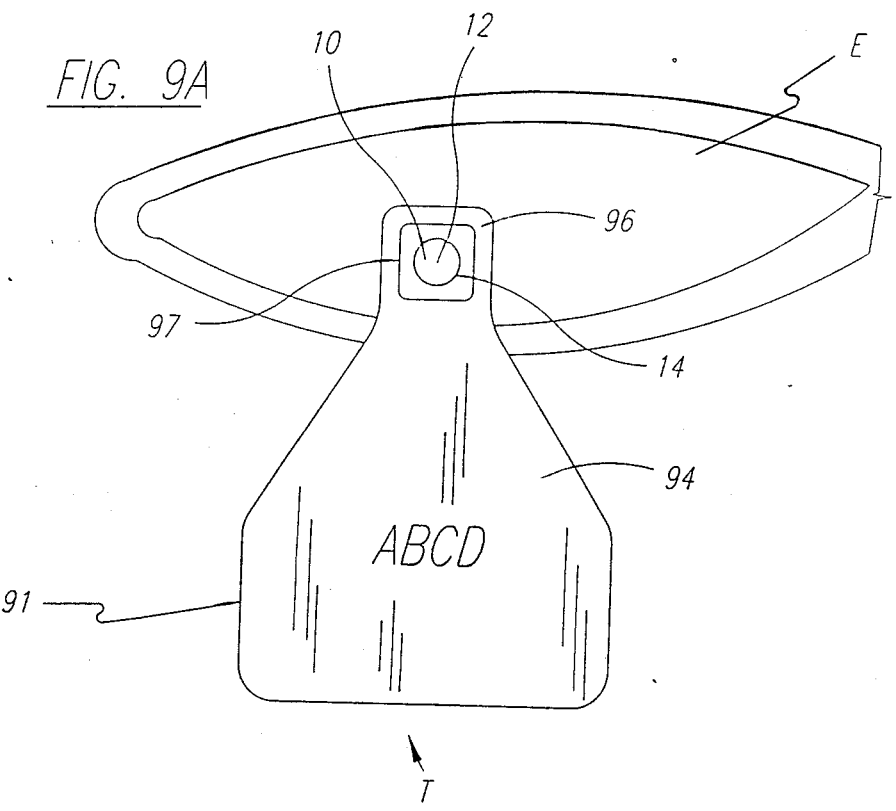

The body 91 of the tag is typically positioned in front of the animal's ear with identification indicia clearly visible as shown in FIG. 9A. The body 91 of the tag is made of soft flexible material which is light in weight and also non-irritating to the animal's skin or other tissue. Tags of all types and designs are contemplated to be usable in this invention. However, the most preferred tag is the Herdsman tag produced by Temple Tag or tamper-evident tag with attached cap and with locking insert alignment ring enabling irreversible attachment of the rivet to the capped tag. The tamper-evident modification is in particular preferred as it is usable with almost all types of applicators.

FIG. 9A shows the front side view 94 of the tag T with the body 91 having the identification indicia ABCD. The tag is attached to the ear E with the rivet R of which only the head 10 with pointed tip 12 and the largest circumferential edge 14 is shown. Tag's neck 96 surrounds the stem 20 (invisible in this drawing) and is partially located behind the head 10. The doubly reinforced area 97 has a square shape.

Figure 9B:
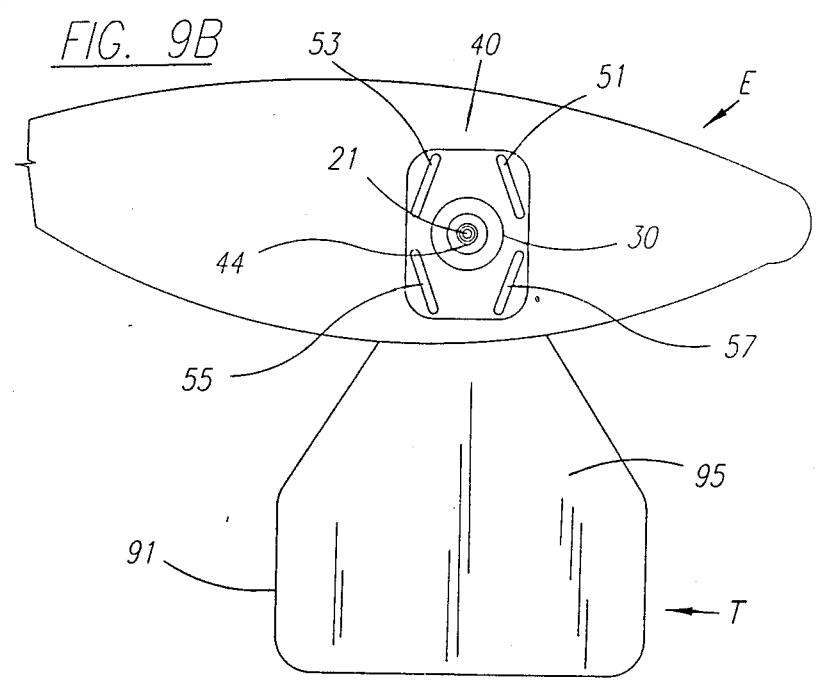

FIG. 9B is the rear view of the ear E with the Tag T visible only from the back side 95 of the tag body 91 without identification indicia. However, if desirable the indicia may be also put on the back side 95 of the body 91 of the tag T. Further visible in this figure is the placement of the base 40 on the back side of the ear E with four ramps 51, 53, 55, and 57 facing outside from the ear. The disk 30 is located in the middle of the base 40 with the ramps positioned around it in previously described manner. The hollow 21 in the hole 44 opens to the outside and is used for inserting the pin 72 of the applicator 70 during the tag application.

FIG. 10 shows the applicator 70 in an open position with pin 72 inserted in the hollow 21 of the rivet's R stem 20. The pin 72 is affixed to the shoulder 80 with a screw 84. In the process of the tag application to the ear, the base 40 is first premounted on the rivet R with ramps 51 and 55 shown, and with ramps 53 and 57 not shown, positioned around the disk, as described above. This is usually done during the manufacturing of the tag/base assembly, so that the two molded products, i.e. the hard material rivet R come out of the molding machine at the same time. Typically, an attendant then attaches the base to the rivet and the product containing the rivet with premounted base are packed and delivered to the consumer. Nevertheless, it is also possible to supply the rivet R and base 40 and tag T separately and assemble these three components at a time when the animal is tagged or prior tagging. In any case, the mounting is done prior to inserting the pin 72 in the hollow 21 of the rivet. Then, the rivet is premounted on the first shoulder 80 of the applicator 70 via the pin 72 being inserted in the hollow 21. On the second shoulder 90 of the applicator 70 in the slit between the retainer plate 99 attached with screw 85, and the holder 98, the tag T is mounted with the side 95 facing the rivet assembly. The strengthened area 97 of the neck 96 and the opening 86 thereof facing the head 10 of the rivet with the strengthened region 97 being positioned away from the first shoulder 80 of the applicator. Area 97 thus faces away from the direction of the inserted head 10 and its shape and size is complementary to and corresponds to the ridge 16 of the head 10. As can be seen from this drawing, the diameter of the opening 86 in the neck 96 of the tag T is much smaller than the diameter of the circumferential edge 14 of the head 10. It should be appreciated that the strong thrust made by the closing of the pliers-like applicator is needed to insert the head 10 through the strengthened area 97 of the neck 96 but once the head is pushed through the opening 86 of the tag's neck 96, it cannot be withdrawn unless the tag is forcibly cut or broken. For practical purposes, during the mounting, the tag is in upside down position and thus the body 91 of the tag sticks out from the applicator 70.

FIG. 11 shows the tag assembly following the ear tag application. Thus the shoulders 80 and 90 of the applicator are closed after the thrust forcing the head of the rivet into the tag's strengthened neck area 97. The position of the tag around the stem 20 of the rivet is clearly visible with suggestion of the locking of the reinforced area 97 of the tag T against the ridge 16 of the rivet's head 10 when the rivet R is pulled back after attachment of tag T during installation in the ear. The ear E of the animal is not shown but would be in the space between the base 40 and the back side 95 of the tag T.

Following the insertion of the tag assembly into the animal's ear, the applicator 70 is opened, the pin 72 is withdrawn from the hollow 21 and by pulling the applicator 70 downward, the tag T is released from the slit between the retainer plate 99 and the holder 98.

The primary advantage of the current invention is the prevention of the loss of the tag and a injury to the animal. Field trials show that the tag assembly of this invention has several magnitude lesser breakage occurrence than the 5-8%, currently acceptable in a cattle industry.

It is claimed:

1. An animal ear tag assembly comprising: a rivet having a stem portion, a conical head portion located at one distal end of said stem portion, and a disk portion located at the other distal end of said stem portion; an identification tag slidably mounted on said stem portion and adjacent to said head portion when said assembly is applied to an animal; and a flexible base slidably mounted on said stem portion and adjacent to said disk portion when said assembly is applied to an animal, said base having a plurality of elongated reinforcement ramps located on an outer side of said base nearest said disk portion, said ramps having sufficient height and thickness to provide protection for said disk.

2. The assembly of claim 1 wherein the rivet is made of a rigid or semirigid plastic material and the base and ramps are made of a soft plastic material.

3. The assembly of claim 2 wherein the rivet's conical head portion has an ear-piercing point and the stem has a hollow sized to be complementary to a pin of an applicator wherein, the ear tag assembly may be applied to an animal's ear by means of an applicator having two shoulders and a pin affixed to one of the applicators shoulders.

4. The assembly of claim 3 wherein the hollow consist of multiple sections of having a decreasing diameter with largest diameter section positioned in the disk stem end portion and the section with narrowest diameter positioned in the head end stem portion.

5. The assembly of claim 4 wherein the ramps are attached to the outerside of the base at four corners positioned parallel to a diagonal of the base.

6. The assembly of claim 5 wherein there are four ramps forming a four piece ramp lock-up around the disk of the rivet wherein, the rivet's disk is protected by enclosing four ramps around the disk preventing the disk from being pulled through the animal's ear, being broken or being caught.

7. The assembly of claim 6 wherein the rivet's disk is protected by protruding of the four ramps away from the base.

8. The assembly of claim 7 wherein the base has rounded corners.

9. The assembly of claim 8 wherein the base has a rectangular shape wherein during a disturbed state of the assembly caused by emergency, the flexible base bends away from the animal ear and the four ramps close around the rivet's disk and lock the disk inside and wherein an obstacle causing the disturbed state is released from an attachment to the assembly and the base and the rivet are returning to an undisturbed position.

* * * * *